United States Patent
Wang et al.

(10) Patent No.: US 8,144,377 B2
(45) Date of Patent: Mar. 27, 2012

(54) DUPLEX SCANNING APPARATUS

(75) Inventors: Chung-Kai Wang, Taipei (TW); Chien-Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 857 days.

(21) Appl. No.: 12/131,343

(22) Filed: Jun. 2, 2008

(65) Prior Publication Data

US 2009/0161179 A1 Jun. 25, 2009

(30) Foreign Application Priority Data

Dec. 20, 2007 (TW) ................ 96148857 A

(51) Int. Cl.
*H04N 1/04* (2006.01)
*G03G 15/00* (2006.01)
(52) U.S. Cl. ......... 358/498; 358/497; 399/374; 399/372
(58) Field of Classification Search .......... 358/498, 358/496, 408; 399/364, 374, 372; 355/23, 355/24
See application file for complete search history.

(56) References Cited

U.S. PATENT DOCUMENTS

| 4,536,077 | A | * | 8/1985 | Stoffel | 358/497 |
| 4,674,734 | A | * | 6/1987 | Ibuchi | 271/9.11 |
| 5,055,880 | A | * | 10/1991 | Fujiwara | 399/203 |
| 6,151,478 | A | * | 11/2000 | Katsuta et al. | 399/372 |
| 6,648,320 | B2 | * | 11/2003 | Iino et al. | 271/3.15 |
| 6,672,581 | B2 | * | 1/2004 | Lee et al. | 271/164 |
| 2007/0003344 | A1 | * | 1/2007 | Lee et al. | 399/374 |
| 2007/0177226 | A1 | * | 8/2007 | Ishida et al. | 358/474 |
| 2009/0161179 | A1 | * | 6/2009 | Wang et al. | 358/498 |

* cited by examiner

*Primary Examiner* — Charlotte M Baker
*Assistant Examiner* — Rury Grisham
(74) *Attorney, Agent, or Firm* — Kirton McConkie; Evan R. Witt

(57) ABSTRACT

The present invention relates to a duplex scanning apparatus. The duplex scanning apparatus includes a sheet input tray for placing a stack of documents thereon. For performing duplex scanning operations on the stack of paper sheets, the documents are successively scanned from the bottommost one to the uppermost one. As a consequence, the scanned documents are stacked in the sheet ejecting tray in the same order as that of the original stack.

7 Claims, 3 Drawing Sheets

DUPLEX SCANNING APPARATUS

FIELD OF THE INVENTION

The present invention relates to a duplex scanning apparatus, and more particularly to a duplex scanning apparatus for performing a two-pass scanning operation.

BACKGROUND OF THE INVENTION

Image scanners are widely used for scanning images of documents, photographs or films. The scanned images can be converted into electronic files, which are then stored, processed or spread. With increasing development of scanning technologies, the image scanners have experienced great growth and are now rapidly gaining in popularity.

In the early stage, the image scanner can scan one side of the document. For scanning both sides of the document, after one side of the document has been scanned, the document should be manually turned over so as to scan the other side of the document. However, the process of manually turning over the document is troublesome. Recently, a duplex scanning apparatus has been developed for automatically performing a duplex scanning operation to scan both sides of the document.

A typical duplex scanning apparatus usually comprises a flatbed image scanning portion and an automatic document feeder arranged above the flatbed image scanning portion. The flatbed image scanner portion is utilized to scan most documents regardless of a single sheet or a thick book. In a case that the thick book is scanned, the automatic document feeder is not feasible. For performing the duplex scanning operation, a stack of paper sheets are successively and continuously fed by the automatic document feeder to be transported through a scan region in the flatbed image scanning portion. For most duplex scanning apparatuses, the flatbed image scanning portion has one scanning module responsible for scanning both sides of the document. After scanned, the paper sheets are exited to the ejecting tray.

The duplex scanning operation performed by the duplex scanning apparatus having one scanning module is also referred as a three-pass scanning operation. When the document is transported across the scan region for the first time, the scanning module scans a first side of the document. When the document is transported across the scan region for the second time, the scanning module scans a second side of the document. Finally, the document is transported across the scan region for the third time to rearrange each document into the same order as that of the original stack but the scanning module does not scan the document.

Referring to FIG. 1, a schematic cross-sectional view of a conventional duplex scanning apparatus having a single scanning module is illustrated. The process of performing the duplex scanning operation by the duplex scanning apparatus 100 of FIG. 1 will be illustrated as follows. First of all, a document 111 to be scanned is placed on a sheet input tray 102, in which a first side of the document 111 faces upwardly. The automatic document feeder 113 transports the document 111 into a first passageway 104. Then, the document 111 enters a scan region 107 through a second passageway 106. When the document is transported across the scan region 107, a scanning module 105 scans the first side of the document 111. Then, the document 111 is transported across a third passageway 108 and a guiding rod 109 to an inverting region 112. The guiding rod 109 is switched to a first position leading the document 111 to the inverting region 112. Next, the document 111 in the inverting region 112 is transported to a fourth passageway 110 through the guiding rod 109, and then transported to the scan region 107 through the second passageway 106. When the document 111 is transported across the scan region 107, the scanning module 105 scans a second side of the document 111. Then, the document 111 is transported across the third passageway 108 and the guiding rod 109 to the inverting region 112. Next, the document 111 in the inverting region 112 is transported across the guiding rod 109 to the fourth passageway 110, the second passageway 106, the scan region 107 and third passageway 108. When the document passes through the scan region 107 for the third time, the scanning module 105 does not scan the document 111. Finally, the guiding rod 109 is switched to the second position, thereby leading the document 111 to the ejecting tray 103.

As previously described, the top document from a stack of documents is transported across the scan region for two times to scan the first and second sides thereof, and is then transported across the scan region for the third time to rearrange each document into the same order as that of the original stack. Since the document is transported across the scan region for three times, such a three-pass scanning operation is time-consuming and has reduced working speed.

For overcoming the above problems, another duplex scanning apparatus having two scanning modules is developed. The duplex scanning operation performed by the duplex scanning apparatus having two scanning modules is also referred as a one-pass scanning operation. When the document is transported across the scan region, the two scanning modules simultaneously scan the first and second sides of the document. In other words, the document needs to pass through the scan region for only one time to perform the duplex scanning operation. In comparison with the duplex scanning apparatus having one scanning module, the second type of duplex scanning apparatus has an increased scanning speed. However, the duplex scanning apparatus having two scanning modules is costly.

Therefore, there is a need of providing an improved duplex scanning apparatus with cost-effectiveness and enhanced working speed.

SUMMARY OF THE INVENTION

It is an object of the present invention to provide a duplex scanning apparatus for performing a two-pass scanning operation, in which the scanned documents are stacked in the sheet ejecting tray in the same order as that of the original stack.

In accordance with an aspect of the present invention, there is provided a duplex scanning apparatus for scanning images of a plurality of documents. The duplex scanning apparatus includes a flatbed image scanning portion and an automatic document feeder. The flatbed image scanning portion includes a scanning module for scanning the images of the documents in a scan region. The automatic document feeder includes a sheet input tray, a sheet ejecting tray, a first transfer channel, a sheet pick-up roller, a friction-enhancing stopper, a transfer roller assembly, an inverting region, a second transfer channel, a sheet ejecting roller assembly and an inverting roller assembly. The sheet input tray is used for placing the documents thereon. The sheet ejecting tray is used for supporting the documents, wherein the sheet ejecting tray is lower than the sheet input tray. The first transfer channel arranged between the sheet input tray and the sheet ejecting tray, wherein a portion of the first transfer channel is disposed within the range of the scan region. The sheet pick-up roller is disposed on the sheet input tray for transporting the documents into the first transfer channel. The friction-enhancing stopper is sustained against the documents to offer a frictional force required to transport the documents into the first transfer channel such that only one of the documents is selected to feed into the first transfer channel for each time. The transfer roller assembly is disposed in the first transfer channel for transporting the documents through the first transfer channel. The inverting region is arranged between the sheet input tray and the sheet ejecting tray. The second transfer channel is arranged between the inverting region and the transfer roller assembly. The sheet ejecting roller assembly is disposed in the vicinity of the sheet ejecting tray for transporting the documents to the sheet ejecting tray. The inverting roller assembly is disposed in the vicinity of the inverting region for transporting the documents from the first transfer channel to the inverting region or from the inverting region to the second transfer channel.

In an embodiment, the inverting roller assembly includes a driving roller and an inverting follower roller. The driving roller is rotated in either a positive direction or a reverse direction.

In an embodiment, the duplex scanning apparatus further includes a first switching element and a second switching element. The first switching element is arranged between the first transfer channel and the sheet ejecting tray for guiding the documents to either the sheet ejecting tray or the inverting region. The second switching element is arranged between the first transfer channel and the second transfer channel for guiding the documents from the inverting region to the second transfer channel.

In an embodiment, the inverting region includes a thin plate for supporting the documents which are exited to the inverting region.

In an embodiment, the duplex scanning apparatus further includes a single-side scanning pick-up arm for transporting the documents one by one to the first transfer channel when a single-side scanning operation is performed.

In an embodiment, the duplex scanning apparatus further includes friction-enhancing stopper adjusting unit for changing an inclined angle of the friction-enhancing stopper when the single-side scanning operation is performed.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a duplex scanning apparatus for performing a two-pass scanning operation.

Figure 1:
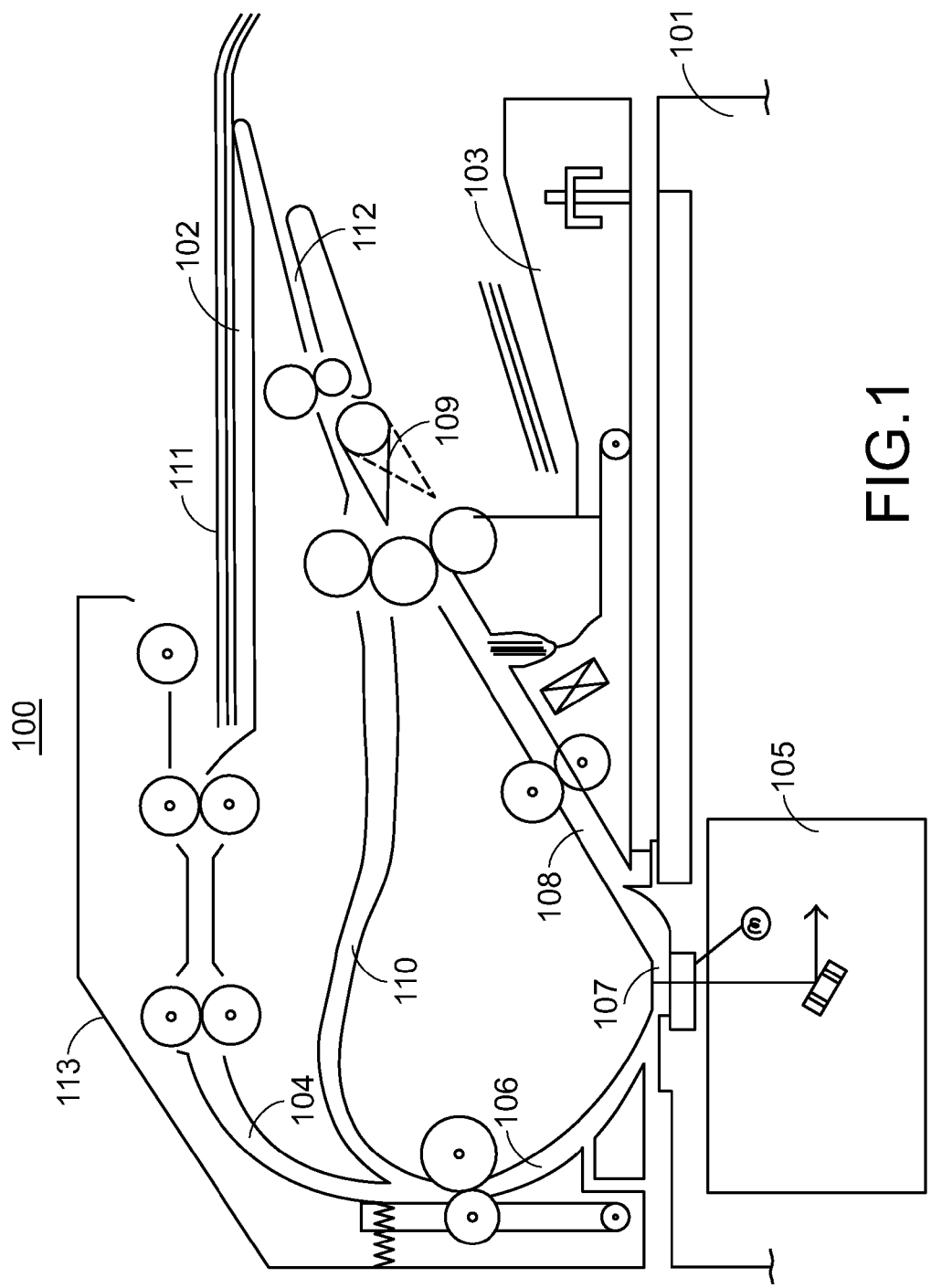
FIG. 1 is a schematic cross-sectional view of a conventional duplex scanning apparatus having a single scanning module.
Figure 2:
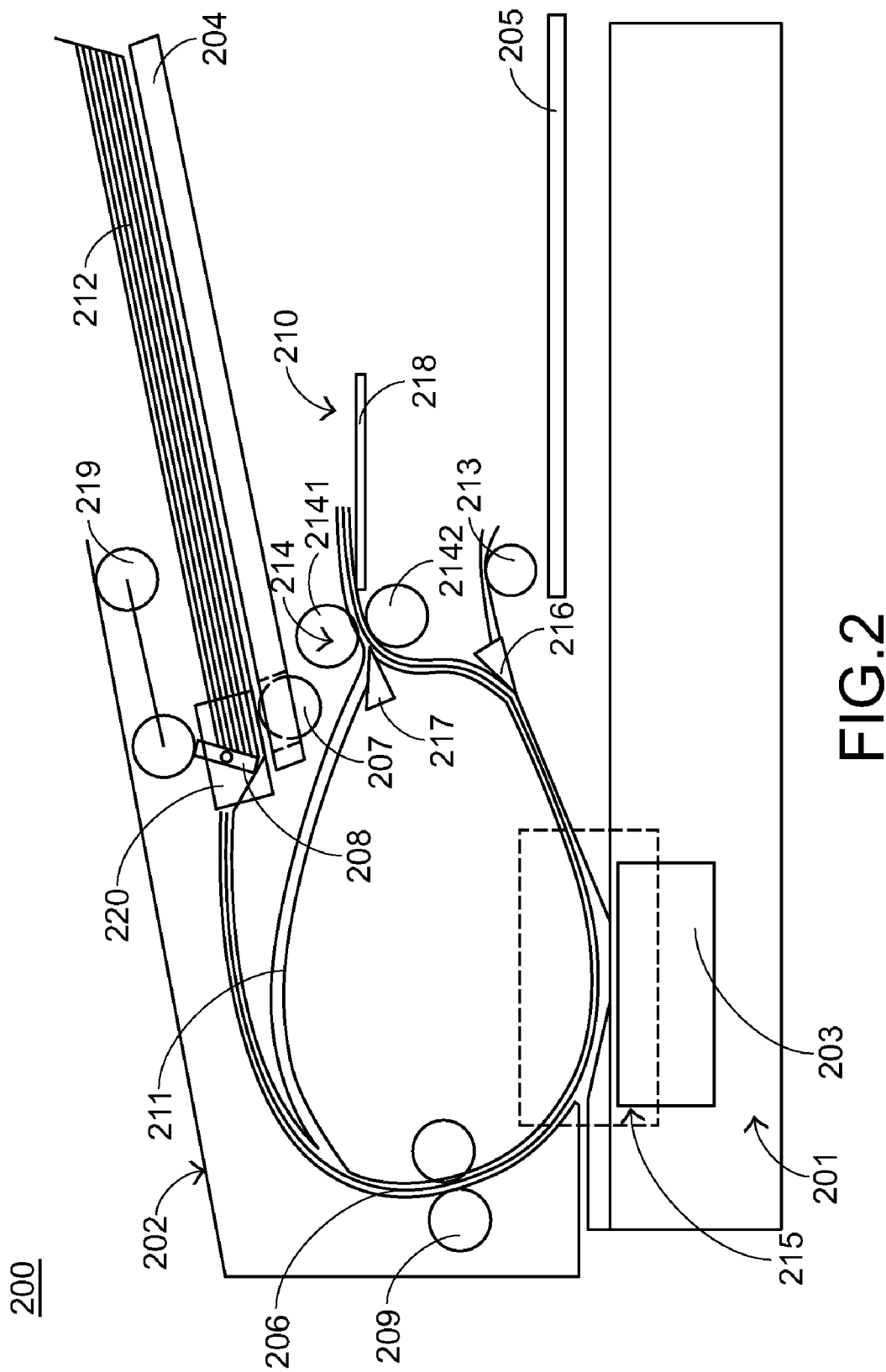
FIG. 2 is a schematic cross-sectional view illustrating a duplex scanning apparatus for performing a duplex scanning operation according to a preferred embodiment of the present invention.

FIG. 2 is a schematic cross-sectional view illustrating a duplex scanning apparatus for performing a duplex scanning operation according to a preferred embodiment of the present invention. The duplex scanning apparatus 200 as shown in FIG. 2 comprises a flatbed image scanning portion 201 and an automatic document feeder 202. The flatbed image scanning portion 201 has one scanning module 203 for scanning images of a document 212 when the document 212 is transported across a scan region 215. The automatic document feeder 202 includes a sheet input tray 204, a sheet ejecting tray 205, a first transfer channel 206, a sheet pick-up roller 207, a friction-enhancing stopper 208, a transfer roller assembly 209, an inverting region 210, a second transfer channel 211, a sheet ejecting roller assembly 213, an inverting roller assembly 214, a first switching element 216 and a second switching element 217.

The documents 212 to be scanned are placed on the sheet input tray 204 of the automatic document feeder 202. The sheet input tray 204 is higher than that of the sheet ejecting tray 205 with respect to the horizon. That is, the sheet input tray 204 is disposed above the sheet ejecting tray 205. The scanned documents 212 are exited to the sheet ejecting tray 205. The first transfer channel 206 is arranged between the sheet input tray 204 and the sheet ejecting tray 205. A portion of the first transfer channel 206 is disposed within the range of the scan region 215. The transfer roller assembly 209 is disposed in the first transfer channel 206 for transporting the documents 212. When one document 212 is transported through the first transfer channel 206 and across the scan region 215, the scanning module 203 scans the document 212. The sheet pick-up roller 207 is disposed on the sheet input tray 204. The friction-enhancing stopper 208 is disposed above the sheet input tray 204 and cooperated with the sheet pick-up roller 207 to feed the document 212 from the sheet input tray 204 into the first transfer channel 206. In the vertical direction, the inverting region 210 is higher than the sheet ejecting tray 205 but lower than the sheet input tray 204. The inverting region 210 includes a thin plate 218, which is disposed in the vicinity of the inverting roller assembly 214. The inverting roller assembly 214 includes a driving roller 2141 and an inverting follower roller 2142. The second transfer channel 211 is arranged between the inverting region 210 and the transfer roller assembly 209. By changing the rotational direction of the inverting roller assembly 214, the document 212 is either exited to the inverting region 210 or transported into the second transfer channel 211. The sheet ejecting roller assembly 213 is disposed in the vicinity of the sheet ejecting tray 205.

Please refer to FIG. 2 again. Hereinafter, the procedure of performing a duplex scanning operation by the duplex scanning apparatus 200 is illustrated. First of all, a stack of documents 212 to be scanned are placed on the sheet input tray 204, wherein the front sides of the documents 212 face downwardly. Due to the weight of the documents 212, the documents 212 are downwardly sustained against the sheet pick-up roller 207. In addition, the front edges of the stack of documents 212 are sustained against the friction-enhancing stopper 208. The sheet pick-up roller 207 is cooperated with the friction-enhancing stopper 208 to offer a frictional force required to transport the document 21. That is, the friction-enhancing stopper 208 functions as a sheet separation roller such that only a single document 212 in direct contact with the sheet pick-up roller 207 and the friction-enhancing stopper 208 is separated from the stack of documents 212 and allowed to be fed into the first transfer channel 206 for each time. After the selected document 212 is fed into the first transfer channel 206, the transfer roller assembly 209 transports the document 212 to the scan region 215. When the document 212 is transported across the scan region 215, the scanning module 203 of the flatbed image scanning portion 201 scan the rear side of the document 212. After the rear side of the document 212 is scanned, the first switching element 216, which is arranged between the first transfer channel 206 and the sheet ejecting tray 205, is maintained at a position leading the document 212 toward the second switching element 217 but the path to the sheet ejecting tray 205 is closed. Next, the second switching element 217, which is arranged between the first transfer channel 206 and the second transfer channel 211 and in the vicinity of the inverting region 210, is switched to a position leading the document 212 toward the inverting region 210 but the path to the second transfer channel 211 is closed. Next, the inverting roller assembly 214 transports the document 212 to the inverting region 210, in which the driving roller 2141 of the inverting roller assembly 214 is rotated in a positive direction. Until the majority of the document 212 is supported on the thin plate 218 of the inverting region 210, the scanning operation on the rear side of the document 212 is completed.

After the majority of the document 212 is supported on the thin plate 218, the first switching element 216 is switched to close the first transfer channel 206 but the second switching element 217 is switched to a position leading the document 212 to the second transfer channel 211 so as to prevent the document 212 from erroneously entering the first transfer channel 206. Meanwhile, the driving roller 2141 of the inverting roller assembly 214 is rotated in a reverse direction, and thus the document 212 is fed from the inverting region 210 into the second transfer channel 211 by the driving roller 2141 and the inverting follower roller 2142. Next, the transfer roller assembly 209 transports the document 212 to the scan region 215. When the document 212 is transported across the scan region 215, the scanning module 203 of the flatbed image scanning portion 201 scan the front side of the document 212. After the front side of the document 212 is scanned, the sheet ejecting roller assembly 213 transports the document 212 to the sheet ejecting tray 205, wherein the front sides of the documents 212 face downwardly to the sheet ejecting tray 205. Meanwhile, the duplex scanning operation on the document 212 is completed. The remainder documents 212 on the sheet input tray 204 successively implement the duplex scanning operations as described above for the first document 212. As a consequence, the documents 212 are stacked on the sheet ejecting tray 205 in the same order as the original stack. Moreover, for facilitating browsing the images of the scanned documents 212, the sequence of the images of the scanned documents 212 can be rearranged by specified software installed in the duplex scanning apparatus 200 such that the images of the scanned documents 212 are arranged in the same order as the original stack.

Especially, for performing duplex scanning operations on the stack of paper sheets, the documents are successively scanned from the bottommost one to the uppermost one. The frictional forces resulted from the documents, the friction-enhancing stopper and the roller should be elaborately controlled. It is preferred that the frictional force u3 between the document and the roller is greater than the frictional force u1 between the document and the friction-enhancing stopper, and the frictional force u1 is greater than the frictional force u2 between the documents.

Please refer to FIG. 2 again. The duplex scanning apparatus 200 further includes a single-side scanning pick-up arm 219 and a friction-enhancing stopper adjusting unit 220. The friction-enhancing stopper adjusting unit 220 is used to change the inclined angle of the friction-enhancing stopper 208, as can be seen in FIG. 2. For implementing a single-side scanning operation, the inclined angle of the friction-enhancing stopper 208 is changed such that the documents 212 are in direct contact with the single-side scanning pick-up arm 219 and the friction-enhancing stopper 208.

Figure 3:
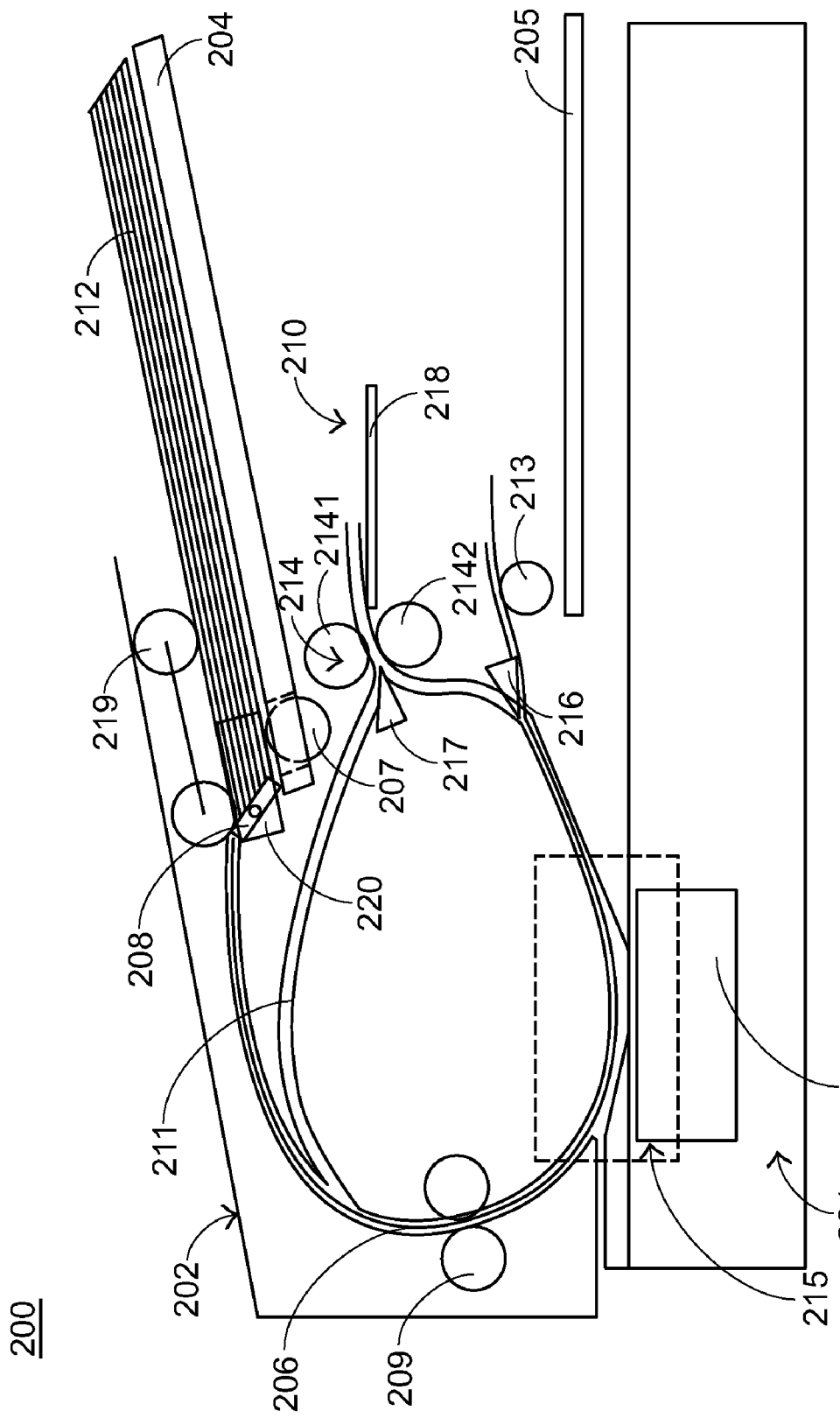
FIG. 3 is a schematic cross-sectional view of the duplex scanning apparatus of the present invention for performing a single-side scanning operation.

FIG. 3 is a schematic cross-sectional view of the duplex scanning apparatus of the present invention for performing a single-side scanning operation. As shown in FIG. 3, by the friction-enhancing stopper adjusting unit 220, the friction-enhancing stopper 208 is changed to have an inclined angle required for performing the single-side scanning operation. As a result, the single-side scanning pick-up arm 219 is in direct contact with the documents 212. In some embodiments, the friction-enhancing stopper adjusting unit 220 has a specific mechanism for rotating the friction-enhancing stopper 208 so as to change the inclined angle of the friction-enhancing stopper 208. Alternatively, the friction-enhancing stopper adjusting unit 220 used for the duplex scanning operation may be replaced with another friction-enhancing stopper adjusting unit 220 exclusively used for the single-side scanning operation.

Hereinafter, the procedure of performing a single-side scanning operation by the duplex scanning apparatus 200 will be illustrated with reference to FIG. 3.

First of all, a stack of documents 212 to be scanned are placed on the sheet input tray 204, wherein the front sides of the documents 212 face upwardly. Next, the single-side scanning pick-up arm 219 is cooperated with the friction-enhancing stopper 208 to offer a frictional force required to transport the document 212 into the first transfer channel 206. After the selected document 212 is fed into the first transfer channel 206, the transfer roller assembly 209 transports the document 212 to the scan region 215. When the document 212 is transported across the scan region 215, the scanning module 203 of the flatbed image scanning portion 201 scans the front side of the document 212. Meanwhile, the first switching element 216 is maintained at a position leading the document 212 toward the sheet ejecting tray 205. After the front side of the document 212 is scanned, the sheet ejecting roller assembly 213 transports the document 212 to the sheet ejecting tray 205, wherein the front sides of the documents 212 face downwardly to the sheet ejecting tray 205. The remainder documents 212 on the sheet input tray 204 successively implement the single-side scanning operations as described above for the first document 212. As a consequence, the documents 212 are stacked on the sheet ejecting tray 205 in the same order as the original stack.

From the above description, when the duplex scanning apparatus of the present invention performs the duplex scanning operation, the document needs to pass through the scan region for two times. That is, the duplex scanning operation by the present invention can be referred as a two-pass scanning operation. In addition, the scanned documents are stacked on the sheet ejecting tray in the same order as the original stack. In comparison with the conventional duplex scanning apparatus performing three-pass scanning operation, the number of transporting the document across the scan region according to the present invention is reduced and the scanning time is shortened. In comparison with the conventional duplex scanning apparatus with two scanning modules for performing one-pass scanning operation, the duplex scanning apparatus of the present invention is more cost-effective because only one scanning module is required.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus for scanning images of a plurality of documents, said duplex scanning apparatus comprising:
   a flatbed image scanning portion including a scanning module for scanning said images of said documents in a scan region; and
   an automatic document feeder comprising:
      a sheet input tray for placing said documents thereon, wherein said documents are arranged from a bottommost document to an uppermost document with a first side of said documents facing downwards and a second side of said documents facing upwards;
      a sheet ejecting tray for supporting said documents, wherein said sheet ejecting tray is lower than said sheet input tray;
      a first transfer channel arranged between said sheet input tray and said sheet ejecting tray, wherein a portion of said first transfer channel is disposed within the range of said scan region, wherein said first transfer channel being configured to position said second side of said documents toward said scanning module when said documents are within said range of said scan region for scanning and when said documents enter said first channel from said sheet input tray;
      a second transfer channel
      a sheet pick-up roller disposed on said sheet input tray for successively transporting said documents into said first transfer channel from said bottommost document to said uppermost document;
      a friction-enhancing stopper sustained against said documents to offer a frictional force required to transport said documents into said first transfer channel such that only one of said documents is selected to feed into said first transfer channel for each time;
      a transfer roller assembly disposed in said first transfer channel for transporting said documents through said first transfer channel;
      an inverting region arranged between said sheet input tray and said sheet ejecting tray;
      a second transfer channel arranged between said inverting region and said transfer roller assembly, said second transfer channel being configured to feed said documents to said first transfer channel, wherein said first transfer channel being configured to position said first side of said documents toward said scanning module when said documents are within said range of said scan region for scanning and when said documents enter said first channel from said second transfer channel;
      a sheet ejecting roller assembly disposed in the vicinity of said sheet ejecting tray for transporting said documents to said sheet ejecting tray; and
      an inverting roller assembly disposed in the vicinity of said inverting region for transporting said documents from said first transfer channel to said inverting region or from said inverting region to said second transfer channel.

2. The duplex scanning apparatus according to claim 1 wherein said inverting roller assembly comprises:
   a driving roller rotated in either a positive direction or a reverse direction; and
   an inverting follower roller.

3. The duplex scanning apparatus according to claim 1 further comprising:
   a first switching element arranged between said first transfer channel and said sheet ejecting tray for guiding said documents to either said sheet ejecting tray or said inverting region; and
   a second switching element arranged between said first transfer channel and said second transfer channel for guiding said documents from said inverting region to said second transfer channel.

4. The duplex scanning apparatus according to claim 1 wherein said inverting region includes a thin plate for supporting said documents which are exited to said inverting region.

5. The duplex scanning apparatus according to claim 1 further comprising a single-side scanning pick-up arm for transporting said documents one by one from said uppermost document to said bottommost document to said first transfer channel when a single-side scanning operation is performed.

6. The duplex scanning apparatus according to claim 5 further comprising a friction-enhancing stopper adjusting unit for changing an inclined angle of said friction-enhancing stopper when said single-side scanning operation is performed.

7. The duplex scanning apparatus according to claim 1 further comprising software installed in said duplex scanning apparatus and configured to rearrange images scanned by said scanning module such that said images are arranged in the same order as said documents in said sheet input tray.

* * * * *